(12) United States Patent
Prasad et al.

(10) Patent No.: US 11,255,214 B2
(45) Date of Patent: Feb. 22, 2022

(54) NEGATIVE THERMAL EXPANSION COMPRESSOR CASE FOR IMPROVED TIP CLEARANCE

(71) Applicant: United Technologies Corporation, Farmington, CT (US)

(72) Inventors: Dilip Prasad, North Granby, CT (US); Gavin Hendricks, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 170 days.

(21) Appl. No.: 16/672,938

(22) Filed: Nov. 4, 2019

(65) Prior Publication Data
US 2021/0131303 A1  May 6, 2021

(51) Int. Cl.
| | |
|---|---|
| F01D 11/24 | (2006.01) |
| F01D 11/18 | (2006.01) |
| F01D 11/22 | (2006.01) |
| F04D 29/58 | (2006.01) |

(52) U.S. Cl.
CPC ............. *F01D 11/24* (2013.01); *F01D 11/18* (2013.01); *F01D 11/22* (2013.01); *F04D 29/584* (2013.01); *F05D 2210/12* (2013.01); *F05D 2220/323* (2013.01); *F05D 2240/30* (2013.01); *F05D 2240/35* (2013.01); *F05D 2300/5021* (2013.01)

(58) Field of Classification Search
CPC .......... F01D 11/24; F01D 11/18; F01D 11/22; F01D 25/005; F01D 25/10; F01D 25/24; F01D 25/08; F01D 25/12; F05D 2210/12; F05D 2220/323; F05D 2240/30; F05D 2240/35; F05D 2260/201; F05D 2300/5021; F05D 2300/505; F04D 29/584; F04D 29/526; F04D 29/642; F02C 9/18

See application file for complete search history.

(56) References Cited

U.S. PATENT DOCUMENTS

| | | | |
|---|---|---|---|
| 2,994,472 A * | 8/1961 | Botje | .................. F01D 21/04 417/352 |
| 4,329,114 A * | 5/1982 | Johnston | ............... F01D 11/24 415/116 |
| 4,578,942 A | 4/1986 | Weiler | |

(Continued)

FOREIGN PATENT DOCUMENTS

| | | |
|---|---|---|
| EP | 3000973 A1 | 3/2016 |
| EP | 3068974 A2 | 9/2016 |

(Continued)

OTHER PUBLICATIONS

EP Search Report dated Mar. 3, 2021 issued for corresponding European Patent Application No. 20205737.8.

*Primary Examiner* — Christopher Verdier
*Assistant Examiner* — Eric A Lange
(74) *Attorney, Agent, or Firm* — Bachman & LaPointe, P.C.

(57) ABSTRACT

A compressor with negative coefficient of thermal expansion case material comprising a rotor having blades with tips, the case including an inner case comprising a negative coefficient of thermal expansion material, and a tip clearance located between the tips and the inner case; wherein the tip clearance is maintained responsive to a flow of air over the negative coefficient of thermal expansion material.

16 Claims, 3 Drawing Sheets

(56) References Cited

U.S. PATENT DOCUMENTS

| | | | |
|---|---|---|---|
| 5,700,129 A * | 12/1997 | Kocian | F01D 17/162 |
| | | | 403/30 |
| 7,824,763 B2 | 11/2010 | Namburi et al. | |
| 9,506,369 B2 | 11/2016 | Boswell et al. | |
| 9,845,731 B2 | 12/2017 | Birnkrant et al. | |
| 10,087,772 B2 * | 10/2018 | Sun | F04D 29/526 |
| 2008/0193278 A1 * | 8/2008 | Erickson | F01D 11/24 |
| | | | 415/115 |
| 2008/0233372 A1 | 9/2008 | Namburi et al. | |
| 2011/0229306 A1 * | 9/2011 | Lewis | F01D 11/24 |
| | | | 415/115 |

FOREIGN PATENT DOCUMENTS

| | | | |
|---|---|---|---|
| WO | 2015119694 A2 | 8/2015 | |
| WO | WO-2020174753 A1 * | 9/2020 | F01D 25/24 |

\* cited by examiner

NEGATIVE THERMAL EXPANSION COMPRESSOR CASE FOR IMPROVED TIP CLEARANCE

BACKGROUND

The present disclosure is directed to a negative thermal expansion compressor case configured for improved tip clearance.

Gas turbine engines provide power by compressing air using a compressor, adding fuel to this compressed air, combusting this mixture such that it expands through the blades of a turbine and exhausting the produced gases. The turbine consists of a disc, rotating about the central shaft of the engine, and a plurality of blades extending radially out of the disc towards the engine casing of the engine. Expansion of the combustion gases through the turbine causes its blades to rotate at high speed and the turbine, in turn, drives the compressor.

The distance between the tips of the blades and the inner surface of the compressor casing is known as the tip clearance. It is desirable for the tips of the blades to rotate as close to the casing without rubbing as possible because as the tip clearance increases, a portion of the compressed gas flow will pass through the tip clearance decreasing the efficiency of the compressor. This is known as over-tip leakage. The efficiency of the compressor, which partially depends upon tip clearance, directly affects the specific fuel consumption (SFC) of the engine. Accordingly, as tip clearance increases, SFC also rises.

As the disc and the blades rotate, centrifugal and thermal loads cause the disc and blades to extend in the radial direction. The casing also expands as it is heated but there is typically a mismatch in radial expansion between the disc/blades and the casing. Specifically, the blades will normally expand radially more quickly than the housing, reducing the tip clearance and potentially leading to "rubbing" as the tips of blade come into contact with the interior of the casing. Over time in use, the casing heats up and expands away from the blade tip, increasing the tip clearance. This may result in a tip clearance at stabilized cruise conditions that is larger than desired resulting in poor efficiency.

Conventionally, tip clearances are set when the engine is cold to allow for radial extension of the disc and blades due to centrifugal and thermal loads, to prevent rubbing. This means that there is initially a large tip clearance, such that the engine is relatively inefficient. When the engine is running, the blades will eventually extend radially to close this clearance, making the engine run more efficiently. Over a longer period of time, however, the temperature of the casing will rise and the casing will expand radially, which will again increase the tip clearance.

The running tip clearance of the high-pressure compressor (HPC) of an aircraft engine has a significant bearing on the efficiency of the HPC module. This, in turn, impacts other module attributes such as turbine durability as well as the engine fuel burn metric. Consequently much effort has been expended in ensuring that the running tip clearance is at the smallest mechanically feasible value.

SUMMARY

In accordance with the present disclosure, there is provided a compressor with negative coefficient of thermal expansion case material comprising a rotor having blades with tips, the case including an inner case comprising a negative coefficient of thermal expansion material, and a tip clearance located between the tips and the inner case; wherein the tip clearance is maintained responsive to a flow of air over the negative coefficient of thermal expansion material.

In another and alternative embodiment, the air is configured to warm the inner case comprising the negative coefficient of thermal expansion and cause a contraction of the inner case and reduce the tip clearance.

In another and alternative embodiment, the compressor with negative coefficient of thermal expansion case material further comprises a collection manifold fluidly coupled to a distribution manifold fluidly coupled to the inner case comprising the negative coefficient of thermal expansion.

In another and alternative embodiment, the compressor with negative coefficient of thermal expansion case material further comprises a valve fluidly coupled between the collection manifold and the distribution manifold, the valve configured to control the flow of air over the negative coefficient of thermal expansion material.

In another and alternative embodiment, the compressor with negative coefficient of thermal expansion case material further comprises a controller coupled to the valve, the controller configured to actuate the valve to control the air flow rate to change the tip clearance by changing the temperature of the negative coefficient of thermal expansion case material.

In another and alternative embodiment, the negative coefficient of thermal expansion case material is configured as a ring configured to produce a symmetric response to the case.

In another and alternative embodiment, the air is selected from the group consisting of compressor cooling air, combustor air and turbine air.

In accordance with the present disclosure, there is provided a gas turbine engine compressor having a tip clearance responsive to a negative coefficient of thermal expansion material comprising an inner case having a negative coefficient of thermal expansion material; at least one blade having a blade tip; the tip clearance located between the inner case and the blade tip; and a collection manifold fluidly coupled to a distribution manifold fluidly coupled to the inner case comprising the negative coefficient of thermal expansion material, wherein the collection manifold and the distribution manifold are configured to direct air to the negative coefficient of thermal expansion material and change the tip clearance.

In another and alternative embodiment, the gas turbine engine compressor further comprises a valve fluidly coupled between the collection manifold and the distribution manifold, the valve configured to control a flow of air over the negative coefficient of thermal expansion material.

In another and alternative embodiment, the gas turbine engine compressor further comprises a controller coupled to the valve, the controller configured to actuate the valve to control the air flow rate to change the tip clearance by changing the temperature of the negative coefficient of thermal expansion material.

In another and alternative embodiment, the gas turbine engine compressor further comprises instrumentation and controls coupled to the controller the instrumentation and controls configured to activate the controller responsive to gas turbine engine information.

In another and alternative embodiment, the negative coefficient of thermal expansion material comprises a case support ring.

In another and alternative embodiment, the air is selected from the group consisting of compressor cooling air, combustor air and turbine air.

In accordance with the present disclosure, there is provided a process for maintaining a tip clearance of a compressor by use of a negative coefficient of thermal expansion material comprises configuring at least a portion of an inner case of the compressor with the negative coefficient of thermal expansion material; at least one compressor blade having a blade tip; the tip clearance located between the inner case and the blade tip; fluidly coupling a collection manifold to a distribution manifold within the compressor; fluidly coupling the distribution manifold to the inner case comprising the negative coefficient of thermal expansion material; directing air from the collection manifold to the distribution manifold to the negative coefficient of thermal expansion material; and changing the tip clearance responsive to heat transfer between the negative coefficient of thermal expansion material and the air.

In another and alternative embodiment, the air heats the negative coefficient of thermal expansion material.

In another and alternative embodiment, the process further comprises fluidly coupling a valve between the collection manifold and the distribution manifold, and controlling the valve to control the air directed to the negative coefficient of thermal expansion material.

In another and alternative embodiment, the process further comprises coupling a controller to the valve, configuring the controller to actuate the valve to control the air flow rate to change the tip clearance by changing the temperature of the negative coefficient of thermal expansion material.

In another and alternative embodiment, the process further comprises coupling instrumentation and controls to the controller; configuring the instrumentation and controls to activate the controller responsive to gas turbine engine information.

In another and alternative embodiment, the air is selected from the group consisting of compressor cooling air, combustor air and turbine air.

The negative thermal expansion compressor disclosed can achieve a technical effect through a thermal contraction of the HPC case through the use of hot air in conjunction with a case architecture featuring negative thermal expansion.

Other details of the negative thermal expansion compressor are set forth in the following detailed description and the accompanying drawings wherein like reference numerals depict like elements.

DETAILED DESCRIPTION

Figure 1:
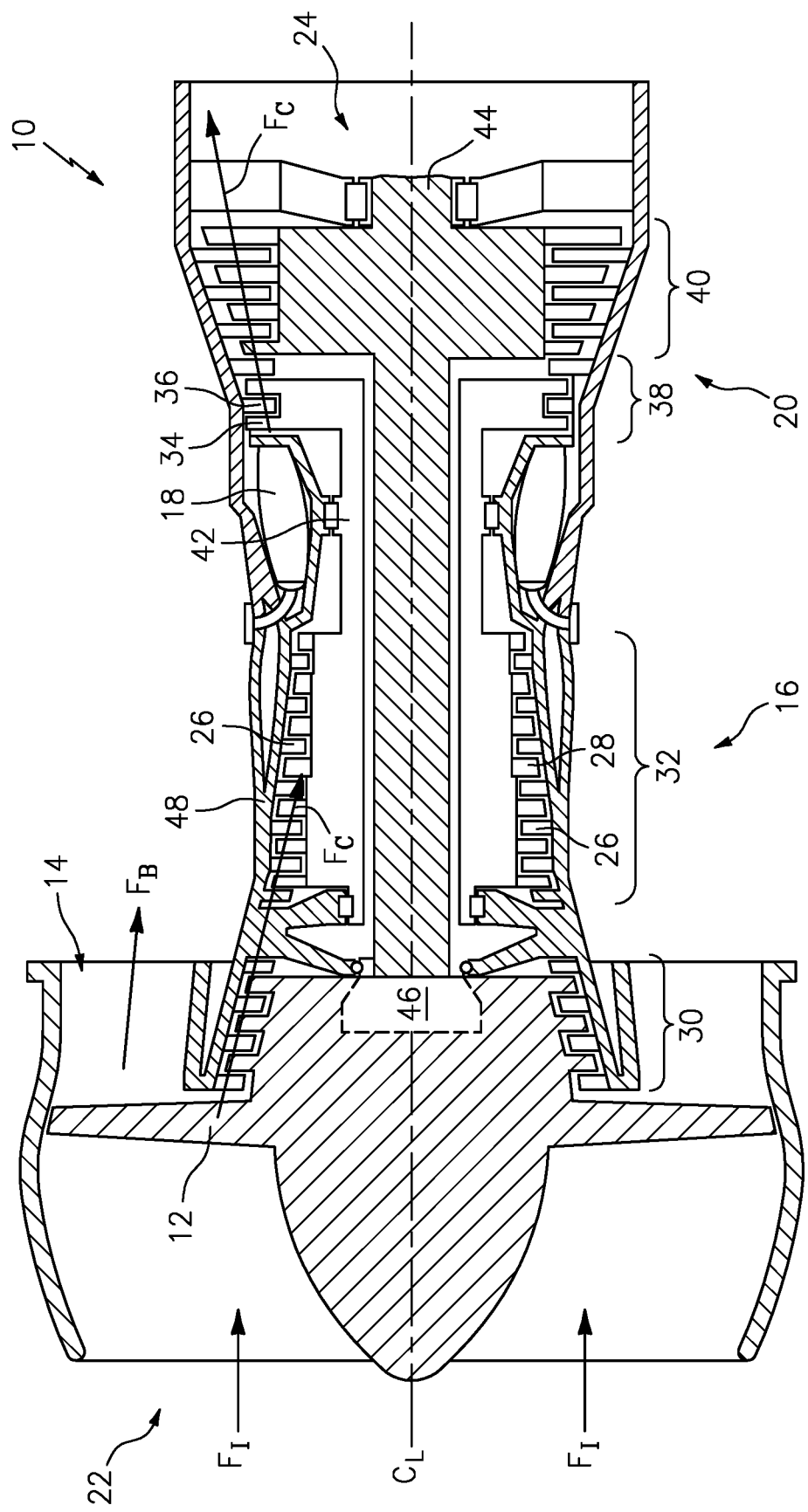
FIG. 1 is a simplified cross-sectional view of a gas turbine engine.

FIG. 1 is a simplified cross-sectional view of a gas turbine engine 10 in accordance with embodiments of the present disclosure. Turbine engine 10 includes fan 12 positioned in bypass duct 14. Turbine engine 10 also includes compressor section 16, combustor (or combustors) 18, and turbine section 20 arranged in a flow series with upstream inlet 22 and downstream exhaust 24. During the operation of turbine engine 10, incoming airflow $F_1$ enters inlet 22 and divides into core flow $F_c$ and bypass flow $F_B$, downstream of fan 12. Core flow $F_c$ continues along the core flowpath through compressor section 16, combustor 18, and turbine section 20, and bypass flow $F_B$ proceeds along the bypass flowpath through bypass duct 14.

Compressor 16 includes stages of compressor vanes 26 and blades 28 arranged in low pressure compressor (LPC) section 30 and high pressure compressor (HPC) section 32. Turbine section 20 includes stages of turbine vanes 34 and turbine blades 36 arranged in high pressure turbine (HPT) section 38 and low pressure turbine (LPT) section 40. HPT section 38 is coupled to HPC section 32 via HPT shaft 42, forming the high pressure spool. LPT section 40 is coupled to LPC section 30 and fan 12 via LPT shaft 44, forming the low pressure spool. HPT shaft 42 and LPT shaft 44 are typically coaxially mounted, with the high and low pressure spools independently rotating about turbine axis (centerline) CL.

Combustion gas exits combustor 18 and enters HPT section 38 of turbine 20, encountering turbine vanes 34 and turbines blades 36. Turbine vanes 34 turn and accelerate the flow of combustion gas, and turbine blades 36 generate lift for conversion to rotational energy via HPT shaft 42, driving HPC section 32 of compressor 16. Partially expanded combustion gas flows from HPT section 38 to LPT section 40, driving LPC section 30 and fan 12 via LPT shaft 44. Exhaust flow exits LPT section 40 and turbine engine 10 via exhaust nozzle 24. In this manner, the thermodynamic efficiency of turbine engine 10 is tied to the overall pressure ratio (OPR), as defined between the delivery pressure at inlet 22 and the compressed air pressure entering combustor 18 from compressor section 16. As discussed above, a higher OPR offers increased efficiency and improved performance. It will be appreciated that various other types of turbine engines can be used in accordance with the embodiments of the present disclosure.

Figure 2:
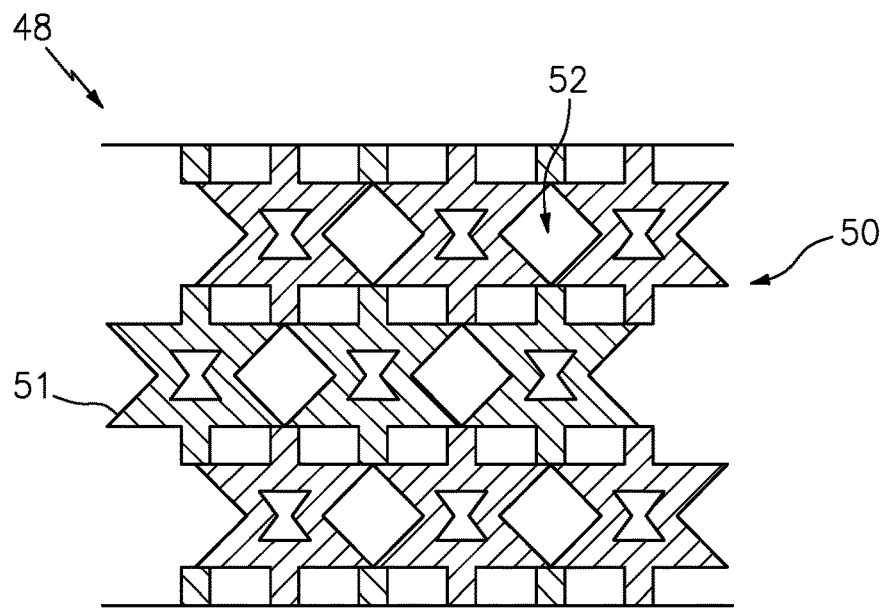
FIG. 2 is a schematic diagram of an exemplary lattice of a negative coefficient of thermal expansion material.

Referring to FIG. 2, a lattice 48 of a material having a negative coefficient of thermal expansion 50 is illustrated according to various embodiments. A unit cell 51 may be formed from material that may comprise nickel, a nickel alloy, molysilicide nickel aluminide, zirconium tungstate, or any other suitable material. In other exemplary embodiments, materials that can have a negative coefficient of thermal expansion can include iron-nickel alloys, carbon fiber, graphite fiber, carbon nanotubes, aramid fiber, zeolite, and combinations thereof. In various embodiments, the material may be fabricated using additive manufacturing. The material may be fabricated using selective laser sintering or direct metal laser sintering, in which a laser fuses powdered metal into a solid part. The unit cell 51 shown is merely one example of a material having a negative coefficient of thermal expansion 50, and those skilled in the art will appreciate that many different shapes may be used. In various embodiments, unit cell 51 may have a width W of less than 1 cm (0.4 inches), less than 1 mm (0.04 inches), or less than 100 microns (0.004 inches). However, in various embodiments, width W may be any suitable size A. The unit cell 51 may be formed in a repetitive pattern. The pattern may cause the lattice 48 to contract as a temperature of the material increases. As the temperature increases, a cross-sectional area of pores 52 between unit cells 51 may increase. Details of the exemplary lattice and unit cells 51 are described in greater detail in U.S. Pat. No. 9,845,731 incorporated by reference herein.

Figure 3:
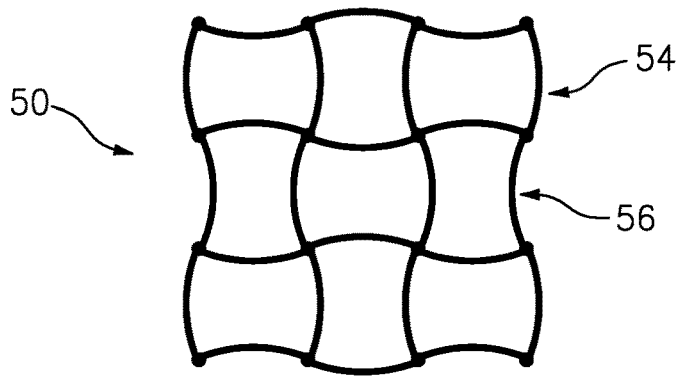
FIG. 3 is a schematic diagram of an exemplary negative coefficient of thermal expansion material.
Figure 4:
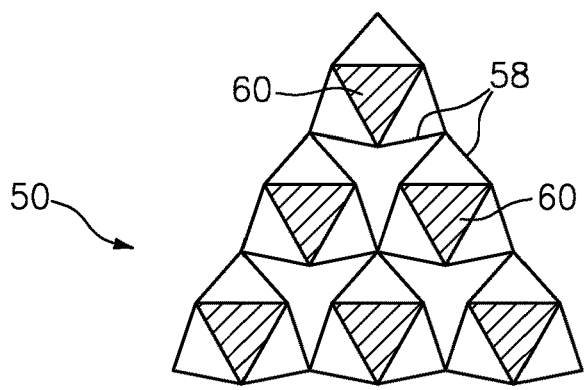
FIG. 4 is a schematic diagram of an exemplary negative coefficient of thermal expansion material.

FIG. 3 and FIG. 4 illustrate exemplary structures of materials having a negative coefficient of thermal expansion 50. Certain bi-material cellular structures can exhibit negative coefficient of thermal expansion behavior. The structure at FIG. 3 includes a first portion 54 that has a high coefficient of thermal expansion. A second portion 56 includes a low coefficient of thermal expansion. In combination the two materials can exhibit an overall negative coefficient of thermal expansion. Similarly to the structures 54, 56 in FIG. 3, the structure shown in FIG. 4 includes a first element 58 with a low coefficient of thermal expansion and a second element 60 with a high coefficient of thermal expansion. The bi-material structure has a net negative coefficient of thermal expansion.

Figure 5:
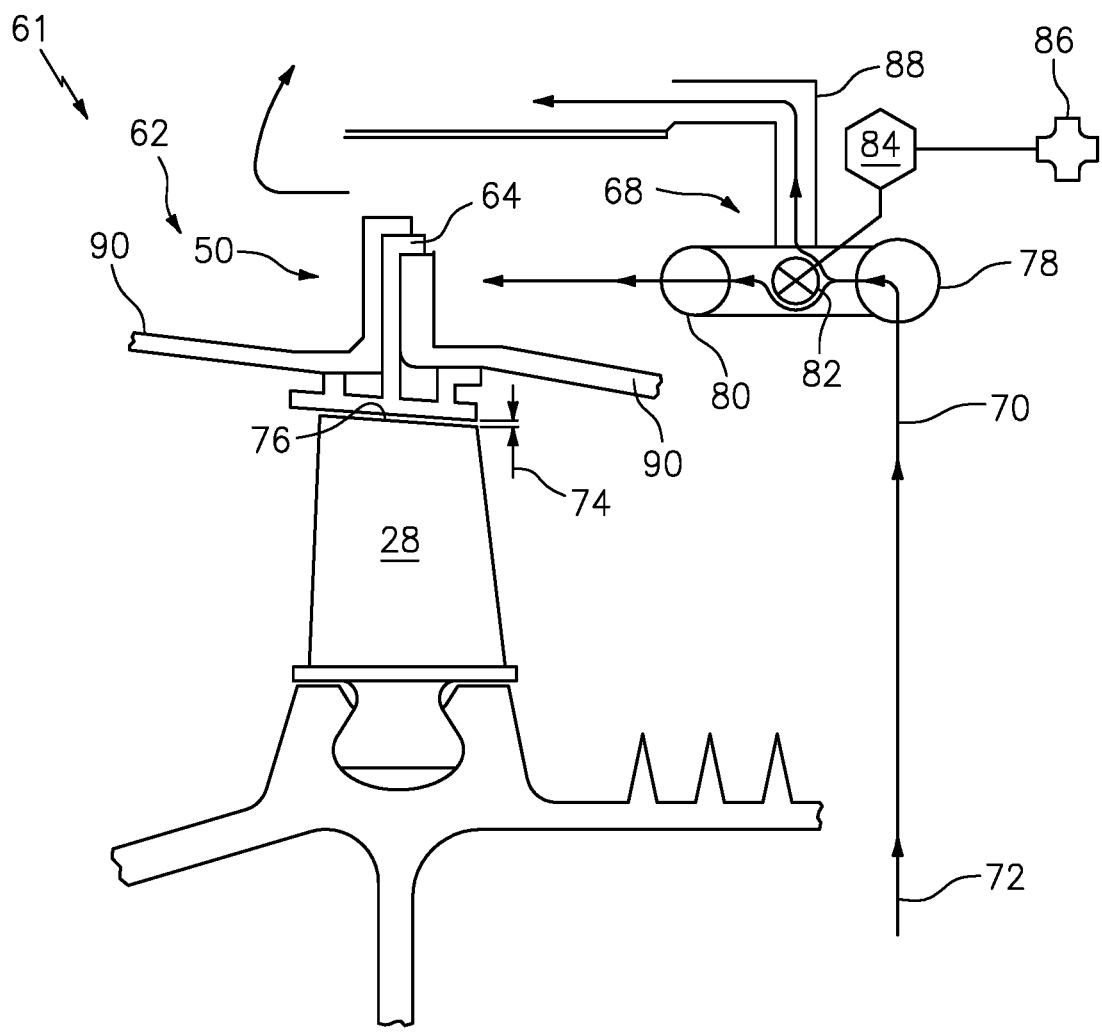
FIG. 5 is a cross sectional view of an exemplary high pressure compressor.

Referring now to FIG. 5 an exemplary portion of a gas turbine compressor 30, 32 section is shown. The negative thermal expansion compressor 61 disclosed can achieve a technical effect through a thermal contraction of the case 62 through the use of hot air in conjunction with a case architecture featuring negative thermal expansion material 50. In the exemplary embodiment, the inner case 62 proximate the compressor 61 can comprise a negative coefficient of thermal expansion material 50. Various portions of the inner case 62 architecture can be employed for the use of the negative coefficient of thermal expansion material 50. In an exemplary embodiment, portions nearest the rotating blades can be utilized. The portions of the inner case 62 that are configured to maintain the tip clearance 74 can be configured with the negative coefficient of thermal expansion material 50. Either axial portions and/or radial portions of the inner case 62 can be employed as well. In another exemplary embodiment, the negative coefficient of thermal expansion material 50 can be formed as a ring 64 that produces a symmetric response to the case 62. The negative coefficient of thermal expansion material 50 can be formed as a connector case 90 that produces a symmetric response to the case 62. In an exemplary embodiment the inner case 62 can be configured to experience the negative coefficient of thermal expansion to produce a predetermined blade tip to case clearance change for from about 5 mils to about 10 mils.

The compressor 61 includes passageways 68 that are used to direct air 70 into the location of the inner case 62 that includes the negative coefficient of thermal expansion material 50. Compressor 61 exit air 72 (e.g., station 3 air) high pressure turbine air can be utilized to change the temperature of the negative coefficient of thermal expansion material 50 to adjust the case 62 dimensions in order to reduce the tip clearance 74 between the case 62 and blade tip 76. In an exemplary embodiment, a collection manifold 78 can be fluidly coupled to the air 70 to collect the air 70 and direct the air 70 to a distribution manifold 80. The distribution manifold 80 can be configured to fluidly couple the air 70 with the portion of the case 62 that includes the negative coefficient of thermal expansion material 50. The air 70 can flow over the negative coefficient of thermal expansion material 50 and exchange thermal energy to heat the material 50. Radial or axial portions of the inner case 62 that are required to control the tip clearance can receive the air 70. A valve 82 can be fluidly coupled between the collection manifold 78 and the distribution manifold 80. The valve 82 can be positioned to control the flow of air 70. The valve 82 can be adjusted to direct the air 70 toward the distribution manifold 80 or to a bypass manifold 88. The valve 82 can be used to control the temperature of the negative coefficient of thermal expansion material 50 and control the tip clearance 74 dimensions between the blade tip 76 and case 62 responsive to the temperature of the material 50. In an exemplary embodiment, the temperature differential employed to change the negative coefficient of thermal expansion material 50 can be from about 50 degrees Fahrenheit to about 100 degrees Fahrenheit. In an exemplary embodiment, a controller 84 can be coupled with the valve 82 and configured to control the valve position. The valve 82 can be controlled to maintain/reduce the allocation of the air 70 to the distribution manifold 80 and/or the bypass manifold 88, since the total flow rate of bleed air 70 remains fixed and the valve position determines whether or not it is utilized to effect the thermal contraction of the case 62. The valve 82 is not intended to control the mass flow rate of bleed air 70. That mass flow rate is fixed by the requirement of turbine cooling, which is the intended final destination of bleed air 70.

In an exemplary embodiment, the controller 84 can be utilized to control the air 70 flow direction to change the tip clearance by changing the temperature of the material 50. The controller 84 can operate based on a predetermined schedule derived from engine operational data. For example, flight profile, predetermined schedules, and engine conditions can be utilized to modify the air 70 temperature and activate the negative coefficient thermal expansion material 50 to change dimension. In another embodiment, the controller 84 can be operated based on instrumentation and controls 86 coupled to the controller 84 and based on real time information (temperature, dimensions, operational mode) from the gas turbine engine 10. The instrumentation and controls 86 include sensors (temperature, pressure, flow rate, altitude), programs, signals, communications links, engine operational data and the like. In an exemplary embodiment, the material 50 can be activated during engine cruise conditions and deactivated during engine transient conditions.

A technical advantage of the negative coefficient of thermal expansion material incorporated with the case is for better control the tip clearance between the case and the blade tips of the high pressure compressor.

A technical advantage of the negative coefficient of thermal expansion material incorporated with the case includes improving engine cycle performance and maintaining the bleed flow rate, thereby enhancing high pressure compressor life.

Another technical advantage of the negative coefficient of thermal expansion material incorporated with the case includes the capacity to control the flow of air supplied to the case and actively control the tip clearance responsive to gas turbine engine conditions.

There has been provided a negative thermal expansion compressor. While the negative thermal expansion compressor has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A compressor with negative coefficient of thermal expansion case material comprising:
 a rotor having blades with tips,
 the case including an inner case comprising a negative coefficient of thermal expansion material, wherein said negative coefficient of thermal expansion case material is configured as a case support ring configured to produce a symmetric response to the case, such that heating said ring contracts said case, and a tip clearance located between the tips and the inner case; wherein said tip clearance is maintained responsive to a flow of air over said negative coefficient of thermal expansion material.

2. The compressor with negative coefficient of thermal expansion case material according to claim 1, wherein said air is configured to warm said inner case comprising the negative coefficient of thermal expansion and cause a contraction of the inner case and reduce the tip clearance.

3. The compressor with negative coefficient of thermal expansion case material according to claim 1 further comprising:
a collection manifold fluidly coupled to a distribution manifold fluidly coupled to said inner case comprising the negative coefficient of thermal expansion.

4. The compressor with negative coefficient of thermal expansion case material according to claim 3, further comprising:
a valve fluidly coupled between said collection manifold and said distribution manifold, said valve configured to control said flow of air over said negative coefficient of thermal expansion material.

5. The compressor with negative coefficient of thermal expansion case material according to claim 4, further comprising:
a controller coupled to said valve, said controller configured to actuate said valve to control the air flow rate to change the tip clearance by changing the temperature of the negative coefficient of thermal expansion case material.

6. The compressor with negative coefficient of thermal expansion case material according to claim 1, wherein said air is selected from the group consisting of compressor cooling air, combustor air and turbine air.

7. A gas turbine engine compressor having a tip clearance responsive to a negative coefficient of thermal expansion material comprising:
an inner case having a negative coefficient of thermal expansion material;
at least one blade having a blade tip;
the tip clearance located between said inner case and said blade tip; and
a collection manifold fluidly coupled to a distribution manifold fluidly coupled to said inner case comprising the negative coefficient of thermal expansion material, wherein said negative coefficient of thermal expansion material comprises a case support ring, wherein said collection manifold and said distribution manifold are configured to direct air to said negative coefficient of thermal expansion material and change said tip clearance such that heating said case support ring contracts said inner case.

8. The gas turbine engine compressor according to claim 7, further comprising:
a valve fluidly coupled between said collection manifold and said distribution manifold, said valve configured to control a flow of air over said negative coefficient of thermal expansion material.

9. The gas turbine engine compressor according to claim 8, further comprising:
a controller coupled to said valve, said controller configured to actuate said valve to control the air flow rate to change the tip clearance by changing the temperature of the negative coefficient of thermal expansion material.

10. The gas turbine engine compressor according to claim 9, further comprising:
instrumentation and controls coupled to the controller, said instrumentation and controls configured to activate said controller responsive to gas turbine engine information, said gas turbine engine information comprises real time information from the gas turbine engine, said real time information selected from the group consisting of temperature, dimensions and operational mode.

11. The gas turbine engine compressor according to claim 7, wherein said air is selected from the group consisting of compressor cooling air, combustor air and turbine air.

12. A process for maintaining a tip clearance of a compressor by use of a negative coefficient of thermal expansion material comprising:
configuring at least a portion of an inner case of the compressor with the negative coefficient of thermal expansion material;
at least one compressor blade having a blade tip;
the tip clearance located between said inner case and said blade tip;
fluidly coupling a collection manifold to a distribution manifold within the compressor;
fluidly coupling said distribution manifold to said inner case comprising the negative coefficient of thermal expansion material, wherein said negative coefficient of thermal expansion material comprises a case support ring;
directing air from said collection manifold to said distribution manifold to said negative coefficient of thermal expansion material, wherein said air heats said case support ring to contract said inner case; and
changing the tip clearance responsive to heat transfer between said negative coefficient of thermal expansion material and said air.

13. The process of claim 12, further comprising:
fluidly coupling a valve between said collection manifold and said distribution manifold, and
controlling said valve to control the air directed to said negative coefficient of thermal expansion material.

14. The process of claim 13, further comprising:
coupling a controller to said valve,
configuring said controller to actuate said valve to control the air flow rate to change the tip clearance by changing the temperature of the negative coefficient of thermal expansion material.

15. The process of claim 14, further comprising:
coupling instrumentation and controls to the controller;
configuring said instrumentation and controls to activate said controller responsive to gas turbine engine information, said gas turbine engine information comprises real time information from the gas turbine engine, said real time information selected from the group consisting of temperature, dimensions and operational mode.

16. The process of claim 12, wherein said air is selected from the group consisting of compressor cooling air, combustor air and turbine air.

* * * * *